United States Patent Office 2,894,859
Patented July 14, 1959

2,894,859

ART OF MANUFACTURING COLD WATER DISPERSIBLE ADHESIVES

Ernest L. Wimmer and Frank Meindl, Milwaukee, Wis., assignors to Chas. A. Krause Milling Co., Milwaukee, Wis., a corporation of Wisconsin No Drawing. Application May 3, 1957
Serial No. 656,765

3 Claims. (Cl. 127—33)

This invention relates to improvements in the art of manufacturing cold water dispersible adhesives.

It is an object of this invention to produce a cold water dispersible starch containing adhesive which is particularly useful as an additive in the manufacture of gypsum wall board, said starch product possessing a unique combination of physical and chemical properties.

Gypsum wall board or "dry-wall" is a popular product of the building industry which has received favor as a replacement for conventional wet plastering in the formation and finishing of interior walls in both residential and commercial construction. It is formed by preparing a "stucco slurry" composed principally of calcined and pulverized gypsum rock and water; the stucco mix is cast onto a paper sheet which is then folded around the edges, and a cover paper sheet is then applied to the gypsum core which sets rather quickly into a hardened mass. This gypsum core enveloped by paper is then dried at elevated temperature to remove excess moisture.

It is general practice in the industry to add a modified starch product to the gypsum stucco before casting which improves the adhesion of the paper to the core. Traditionally, this product has been a starch or starch-bearing flour which has been acidified with mineral acid and thence processed to increase the cold water solubles or soluble dextrin-content and to lower the gelatinization temperature of the starch.

Starch products produced for this purpose by the wet milling starch industry are known as thin boiling starches; those produced by the dry milling industry are known as dextrinized flours. The satisfactory range of cold water solubles in these materials is 10–35%.

It has been a general belief that the soluble portion of the starch modified in this manner migrates to the surface of the core during drying and improves adhesion of the paper to the core. Gelatinization of the residual starch within the core is believed to occur during drying and a portion of this also migrates toward the surface.

There have been, nevertheless, several important problems associated with the use of thin boiling starches and dextrinized flours for use as a gypsum additive.

A considerable portion of the starch is in the original raw granule state and although its gelatinization may occur during drying, a large proportion of it never finds its way to the critical zone near the surface of the board and is wasted. Thus, an unduly large quantity of material is required to do the adhesive job. If the solubility of the starch is increased in the usual manner, i.e. by increasing the severity of the processing conditions by which thin boiling starch and dextrinized flours are produced, there arises a concurrent increase in the reducing sugar value which is indicative of a reduction in molecular weight of the starch solubles. Such a material of very high cold water solubles no longer performs a satisfactory job as an adhesive in this application. In an attempt to solve this problem, raw starch has been cooked and a paste added to the stucco, or a precooked and dried starch product has been used; however, the resultant stucco is too viscid to pour and handle efficiently and the resultant core is too difficult to dry because of the moisture retaining property of the cooked, unmodified starch or flour.

Another problem encountered is the defect in gypsum board known as "splitting." This term is applied to the condition that exists when there is a weakness in the core near the surface and there arises a core to core separation under stress rather than a core to paper separation. This effect is believed due to calcination of the core below the surface during drying of the board. Thus, loss of water of crystallization by the gypsum results in a localized weakness within the core. The starch product generally aids in moisture retention; however, if the modified starch product is produced by conventional methods to yield good migration and the desired paper-core adhesion, it no longer possesses sufficient moisture retention properties near the surface of the core to prevent "splitting."

It is a further object of this invention to produce a starch bearing additive for gypsum board which will impart improved properties to the gypsum board, and which will function with improved efficiency when compared with other starch-bearing additives available for this purpose.

A more specific object of the invention is to provide a product and method of manufacturing same which when used in the production of gypsum board is highly soluble, is free to migrate and produce excellent core to paper adhesion while possessing sufficiently high molecular weight (low reducing substance) that it retains sufficient moisture near the surface to minimize splitting, said product being of sufficiently low viscosity when added to the stucco that it does not unduly raise the consistency of the stucco or interfere with the normal molding or casting of the board.

A further object of the invention is to provide a product which is particularly economical because a smaller quantity is required in the stucco to produce a paper-core adhesion equivalent to that produced by the conventional product.

A further object of the invention is to provide an improved product which has excellent properties in other applications, particularly as a cold water dispersible adhesive having high solubility and low viscosity and being capable of producing a flexible film, so as to be an improvement over dextrins which have been highly degraded to obtain their low viscosity and high solubility and thus produce very brittle non-flexible films.

Other objects of the invention are to provide a product which has the following advantages over conventional products such as dextrinized flour and thin boiling starch:

(1) It produces a more satisfactory bond between gypsum core and paper cover.

(2) It prevents the excessively rapid escape of moisture near the surface of the core and thus minimizes "splitting" i.e., a core-core separation when the paper cover is stripped from the core.

(3) It produces satisfactory bonding of paper-core at significantly lower concentration than conventional products.

It has been mentioned that a very high degree of cold water solubles is desirable for efficiency because much of the non-soluble starch is wasted. Research has shown that when raw starch or flour is acidified in the dry state and then heated to produce a high degree of solubles (i.e. greater than 35% cold water solubles) a large amount of energy is required to degrade the compact, raw starch granules to yield these high solubles. It is believed that because of the tightly bound internal structure of the raw starch, the contents must be degraded to an unduly small size or low molecular weight so that the fragments of degraded starch molecules so produced can be freed and extracted by cold water. The high energy requirement has heretofore been obtained by either raising the temperature required for the conversion, increasing the time of the reaction or increasing free acidity. As previously mentioned, the type of cold water solubles produced in this fashion are no longer satisfactory for the production of a good core-paper bond when this type of dextrinized flour or thin boiling starch of high solubles is added to stucco for gypsum board production.

With the present invention a product can be produced of very high solubles and very low reducing sugar value, i.e. with a soluble fraction of high molecular weight, but yet sufficiently degraded so as not to unduly raise the viscosity of the stucco.

In order to accomplish this, the starch or starch-bearing product is first pregelatinized in the presence of water and the pregelatinized product is dried. The forces by which starch is tightly bound in the raw granule are loosened by heat and water as the starch swells or gelatinizes. The dried pregelatinized starch product is then acidified and processed under comparatively mild conditions of temperature and holding time. It has been found that the solubles content rises very high with a minimal amount of molecular degradation as is evidenced by a low increase in reducing sugar value, this low increase in reducing sugar value being evidence of partial depolymerization of the starch present.

It is believed that the precooking of the starch has sufficiently ruptured the starch granules and disrupted the associated forces so that the entire structure is easily accessible to the catalytic action of the acid and most important, the large fragments which are produced are easily extractable by cold water from the residual starch network and the extraction of such comparatively large fragments of low reducing sugar value is not inhibited or restricted by tight granule structure of uncooked or ungelatinized starch.

RAW MATERIALS

The raw material for the improved process may be cereal or tuber starches or the crude starch-rich flours produced from those cereals or tubers. Satisfactory cereal starches or flours may be derived from corn, wheat, sorghum, rice or the like, and satisfactory tuber starches or flours may be derived from potato and tapioca. As a raw material, relatively large fragments of cereal endosperm known as cereal grits, e.g. corn grits, rice grits, or the like which are rich in starch, may also be used.

PRECOOKING OR PREGELATINIZATION TREATMENT

There are several ways in which the starch product may be pre-cooked and dried prior to treatment with acid. The starch or flour may be suspended as a slurry in water, said slurry containing as much as 50% by weight of solids, and then this slurry is contacted with steam heated drum driers which simultaneously gelatinize the starch present and dry the gelatinized starch. Alternatively, the slurry may be cooked before it is dried on the drum driers. A continuous heat exchange device, such as the Votator (Girdler Corp.) or a steam jet cooker are satisfactory for cooking heavy starch slurries before drying on steam heated drum driers. In either case, the dried product is milled to a flour.

The larger particles of endosperm or grits, when used as a raw material, are conveniently utilized using an alternate cooking procedure. The grits, such as corn grits normally produced by the dry milling of corn are treated with water and held at an elevated temperature to allow the moisture to permeate or temper the endosperm particles. It is common practice to temper such grits to 18–35% moisture and to hold them in storage 1–6 hrs. at 130–160° F. to permit moisture penetration. The grits are then fed between gas heated rolls (300–600° F.) which are maintained under tension. The grits are squeezed into a flake, gelatinized and dried almost instantaneously and milled to a flour.

Another convenient method of pregelatinizing and drying the raw material is to pass a filter cake of moist starch or a crude mixture of starch and protein which normally is obtained as a by-product of the wet milling industry over a steam heated drum drier. An example of the latter material produced from corn is the material of commerce known as Mogul.

ACIDIFICATION

Mineral acids are preferred for acidification of the pregelatinized product. The most convenient reagent for this purpose is gaseous anhydrous hydrogen chloride. The gas is readily absorbed by the pregelatinized starch bearing material and the distribution of acid is more uniform than is obtained by any other reagent. The acid, however, may be applied to the pregelatinized starch as an aqueous solution. Solutions of hydrochloric, sulfuric, phosphoric and sulfamic are particularly useful. They are added as fine spray to the well-agitated pregelatinized dry starch product. The acidification may be conveniently carried out in commercially available blendors or mixers designed for handling powders or flours.

The amount of acid to be added is intimately correlated with two other important processing variables, i.e. the temperature of conversion and the holding time. This correlation will be illustrated in succeeding examples. These variables are controlled so as to yield the products which will be subsequently defined in terms of physical and chemical properties of the finished product. We have found a conveniently operable range when the dry pregelatinized product has been acidified to a pH value of 2.0–3.5 (pH values for dry products in this memorandum refer to those of a 10% slurry or dispersion of the dry substance in distilled water).

PROCESSING CONDITIONS

The acidified pregelatinized dry flour is maintained at a fixed temperature for a given length of time to convert the starch content to the desired specifications. Satisfactory products have been prepared from pregelatinized starches acidified to a range of pH values of 2.0–3.5 when these products have been treated within the temperature range of 70° F.–250° F. when the appropriate holding time is applied. This may be from several days to several minutes depending of course upon the pH value and treatment temperature. As previously stated this range will be illustrated in examples which follow.

The conversion of acidified precooked material may be carried out at normal room temperatures in a simple holding bin or for accelerated conversions, a mixing device equipped with a heat exchange surface e.g. with a steam jacket and designed to minimize localized over-heating may be used.

ALTERNATE ONE-STEP CONVERSION

As an alternate method of processing we have found that it also is practical to precook and dry and modify the starch product simultaneously. This can be conducted in a most advantageous manner if a small amount of acid is added to the starch product prior to cooking and drying. Thus in the preparation of a pregelatinized flake from corn grits, the acid required is added to the water which is used to temper the grits to the desired moisture content. Then, when the acidified grit is passed over the very hot steel rolls, the product is cooked and dried and then the flake is further converted to the desired level as defined in these specifications all in one operation. Processing conditions for this method are the same as described previously for the production of a precooked and dried flake from corn grits. The only important variation is the addition of acid to the temper water. Sufficient acid (muriatic is preferred although other strong acids may be used) is added to lower the pH value of the exit flake to the range 2.0–3.5.

In a similar manner, a starch containing filter cake as produced in the wet milling starch industry can be acidified by incorporation of mineral acid before filtration to yield an acid cake of pH value of approximately 2 just prior to passing the filter cake over heated drums which then simultaneously precook, dry and convert the product.

NEUTRALIZATION OF ACIDITY

If the product is to be stored for long periods, it is advisable to neutralize the acidity of the finished product to arrest the conversion. This may be done in a most convenient manner by mixing the dry product in an atmosphere of gaseous ammonia to a pH value of 4.0–6.0. Other alkalies such as aqueous ammonia, or solutions of caustic soda, soda ash, etc. may be applied as a spray to raise the pH value to the range considered safe for stable storage. References in the claims to acidity, however, refer to the acidity before neutralization if such neutralization is used.

PRODUCT SPECIFICATIONS

The uniqueness of the product of this invention is characterized by the high cold water solubles and correspondingly low reducing sugar value of the starch present. The relatively low viscosity of the precooked material is also of value. These facts are illustrated in Table I, appearing hereafter, which characterizes several dextrinized flours and thin boiling starches produced in the traditional manner and compares them with products produced by the present invention and within the scope of these specifications.

Products which perform in outstanding fashion as an additive in gypsum board manufacture and produced according to this improved procedure, which have a cold water soluble content in the range of 35–50% have a reducing sugar value of 0.25–1.5%, and those which have a cold water soluble content in the range of 50–80%, have a reducing sugar value of 0.50–3.0%. This range of cold water solubles is in excess of that present in products such as dextrinized flour and thin boiling starch as produced in conventional fashion for the gypsum industry, and it is apparent from Table I that if highly soluble materials were produced in the conventional manner, they would have reducing sugar values in excess of those described herein and would not perform in a satisfactory manner as a gypsum additive. All these products when prepared as 10% slurries in water possess viscosity when measured by the Brookfield Synchroelectric Viscometer at 25° C. not substantially greater than 100 cps., and preferably in the range of 10–100 cps.

There is also tabulated in Table I the properties of a precooked and dried flour produced from tempered and flaked corn grits. The very high viscosity of this material should be noted. Materials such as this, were once employed in wallboard manufacture but their high viscosity rendered them unsatisfactory and the high water binding property rendered the wall board extremely difficult to dry.

Examples

In Example I is illustrated the preparation of an excellent wallboard additive wherein a precooked and dried flake from corn grits is acidified and aged at room temperature to yield the satisfactory conversion, whereupon the acidity is neutralized and the product is used in the production of gypsum wallboard.

Example I

Raw material is used which has been prepared by tempering corn grits to 20% moisture and by then passing them between steel rolls which have been heated to 500° F. Five pounds of this material ground to a flour was treated with gaseous hydrogen chloride. The flour was tumbled in a mixer while the acid was added. The flour was acidified until a sample slurried in water at 10% concentration yielded a pH value of 2.60. The product was stored in a closed container for 72 hours at about 75° F. The flour was then returned to a mixer and gaseous ammonia was introduced until a sample slurried in water at 10% concentration yielded a pH value of 5.4. The physical and chemical properties of this material are given in Table I.

This product has been tested as an additive to gypsum stucco in the preparation of wallboard. When added in an mount equivalent to 2 g. per 1000 g. of dry ingredient, a test board was obtained with 0–2% failure of the paper-core adhesion. A control product using traditionally produced dextrinized flour such as Corn Flour A of Table I, exhibited a bond failure of over 50%. Ordinarily, as much as 6 g. of flour/1000 g. of solids is required to produce a bond without bond failure.

In the Example II which follows, the conversion process is accelerated by heating the acidified and pregelatinized flour prior to neutralization. This process yields a slightly higher production of reducing substance and a lower viscosity, indicative of slightly greater degradation; however, the disadvantage of the long holding period is overcome.

Example II

Five pounds of the pregelatinized corn flour as prepared from corn grits (Example I) was acidified to a pH value of 2.66 with gaseous hydrogen chloride, and the acidified flour was then heated to 150° F. while agitating in a heated reaction tube. After 5 minutes the product was quickly cooled and the acidity was neutralized by adding gaseous ammonia to a pH value of 5.20. This product is characterized in Table I.

Example III describes the preparation of a more highly converted product which still serves as a very successful addend to gypsum wallboard for improved core-paper adhesion.

Example III

Five pounds of pregelatinized flour prepared from corn grits was acidified to a pH value of 2.53 with gaseous hydrogen chloride and then the acidified flour was heated with agitation in a reaction vessel at a temperature of 200° F. for five minutes. The product was neutralized with gaseous ammonia to a pH value of 5.2. It is characterized in Table I.

Example IV describes the preparation of the product of the invention in which the raw material is a product which has been gelatinized and dried on steam heated rolls. The product of this example is produced from a filter cake of crude starch and protein which is a by-product of the wet corn milling industry. The filter cake is usually passed over steam heated drums to gelatinize and dry the starch.

Example IV

A sample of crude starch-protein mixture produced as a by-product of the manufacture of pure starch by the wet milling industry and which had been precooked and dried on steam heated rolls (the product of commerce, "Mogul" was used) served as the raw material. One pound of this material was acidified to a pH value of 2.4 with gaseous HCl and was allowed to stand three days at 75° F. At the end of this time, the acidity was neutralized by gaseous ammonia. The product characterized in Table I is an excellent additive for production of gypsum board.

Example V is an illustration of the invention wherein corn grits are tempered in water containing mineral acid to the desired pH and moisture level, and then cooked, converted and dried by passing them between hot rolls.

Example V

Corn grits of 15% moisture are treated with water and muriatic acid in a mixing chamber so that the effluent mixture contains 18% moisture and a homogenate of this material at 10% solids has a pH value of 3.3. After holding two hours to allow penetration of the grits, the acidified material is passed between gas fired rolls at 550° F. The flaked product is ground to a flour and neutralized with gaseous ammonia until the product has a pH value of 6.0. The properties of this product useful in gypsum board manufacture are disclosed in Table I.

TABLE I

*Comparison of conventionally produced dextrinized flours and thin boiling starches with products of present invention*

| Product | Cold Water Sol., Percent | Reducing Sugar Value, Percent Calc. as Dextrose | Viscosity, Cps., 10% Paste at 25° C. except as Otherwise Noted |
|---|---|---|---|
| I. Conventional Products: | | | |
| 1. Dextrinized Corn—Flour A | 15.9 | 1.65 | ¹ 6 |
| 2. Dextrinized Corn—Flour B | 28.0 | 2.59 | ¹ 5 |
| 3. Thin Boiling Starch | 27.6 | 1.47 | ¹ 8 |
| II. Products of Invention: | | | |
| 1. Product Example I | 55.1 | 0.53 | 48 |
| 2. Product Example II | 45.0 | 0.90 | 29 |
| 3. Product Example III | 63.7 | 1.35 | 20 |
| 4. Product Example IV | 54.2 | 0.46 | 100 |
| 5. Product Example V | 35.0 | 0.65 | 88 |
| III. Untreated Precooked Grits: | | | |
| 1. Raw Material like raw material used in Examples I–III | 20.1 | 0.32 | 1,096 |
| IV. Untreated Precooked Starch-Protein Mixture: | | | |
| 1. Raw Material like raw material used in Example IV | 8.2 | 0.22 | 3,000 |

¹ At 70° C.

From the above it may be seen that while the product is particularly advantageous when used in gypsum wall board manufacture, that the product also has excellent properties as a cold water dispersible adhesive for other uses where high solubility, low viscosity, and the ability of producing a very flexible film are required.

It is to be understood that the present invention is not to be limited to the exact details or steps described for obvious modifications will occur to persons skilled in the art.

What we claim is:

1. The method of manufacturing a cold water dispersible adhesive comprising partially depolymerizing a pregelatinized and dried starch product in the dry state by treatment with sufficient mineral acid to give a ten percent test suspension of said starch product in water a pH value in the range of 3.5 to 2.0, heating said acidified product to a temperature of 70° to 250° F. with sufficient heating time as determined by the amount of acid and temperature to give the product when in a dry state the following characteristics: cold water solubles in the range of 35–80% with a reducing sugar value of .25–1.5% when the cold water solubles are in the range of 35–50%, and with a reducing sugar value of .50–3% when the cold water solubles are in the range of 50–80%; and a viscosity of between 10 and 100 cps. at 25° C. when there is 10% slurry of the dry material in water.

2. The method of manufacturing a cold water dispersible adhesive comprising partially depolymerizing a pregelatinized and dried starch product in the dry state by treatment with sufficient acid to give a ten percent test suspension of said starch product in water a pH value in the range of 3.5 to 2.0, heating said acidified product to a temperature of 70° to 250° F. with sufficient heating time as determined by the amount of acid and temperature to give the product when in a dry state the following characteristics: cold water solubles in the range of 35–80%, with a reducing sugar value of .25–1.5% when the cold water solubles are in the range of 35–50%, and with a reducing sugar value of .50–3% when the cold water solubles are in the range of 50–80%; and a viscosity which is not substantially more than 100 cps. at 25° C. when there is a 10% slurry of the dry material in water.

3. A cold water dispersible adhesive comprising a pregelatinized and dried starch bearing material, said adhesive having cold water solubles in the range of 35–80%, wherein the reducing sugar value is .25–1.5% when the cold water solubles are in the range of 35–50% and wherein the reducing sugar value is .50–3% when the cold water solubles are in the range of 50–80%; and having a viscosity of not substantially more than 100 cps. at 25° C. when there is a 10% slurry of the dry material in water.

References Cited in the file of this patent

UNITED STATES PATENTS

| 1,500,452 | Haggerty | July 8, 1924 |
| 2,207,339 | Camp | July 9, 1940 |
| 2,238,339 | Nivling | Apr. 15, 1941 |
| 2,432,195 | Hansen | Dec. 9, 1947 |
| 2,590,013 | Huntzicker et al. | Mar. 18, 1952 |
| 2,669,523 | Kerr | Feb. 16, 1954 |
| 2,732,309 | Kerr | Jan. 24, 1956 |

FOREIGN PATENTS

| 132,311 | Australia | Apr. 27, 1949 |